//UNITED STATES PATENT OFFICE.

ALFRED E. MERRITT, OF GAINESVILLE, GEORGIA.

METHOD OF PRODUCING A RUBBER-CONTAINING PRODUCT.

1,045,053. Specification of Letters Patent. Patented Nov. 19, 1912.

No Drawing. Application filed January 23, 1912. Serial No. 672,889.

*To all whom it may concern:*

Be it known that I, ALFRED E. MERRITT, a citizen of the United States, residing at Gainesville, in the county of Hall and State of Georgia, have invented a new and useful Method of Producing a Rubber-Containing Product, of which the following is a specification.

This invention relates to a method of producing a rubber containing product.

The object of the invention is in a novel and practical manner so to treat crude rubber as to impart to it properties that will particularly adapt it for use in the manufacture of vehicle tires, hose, belting and other articles where its use will be of advantage; materially to lower the cost of production of such articles by largely reducing the quantity of rubber requisite to the procedure; and to impart wear and weather resisting qualities to the products that will greatly enhance their value.

With the above and other objects in view, as will appear as the nature of the invention is better understood, the same consist, generally stated, in the method of producing a rubber containing product, which consists in dissolving crude rubber in a compound solvent, in which one of the resolvents acts directly on the rubber and the other on the resins and other impurities thereof, to a semi-liquid condition in which all of the components of the rubber are in solution, intimately incorporating a fibrous material with the mass, drying until the solvents are eliminated, coagulating the rubber, and finally drying it.

The invention consists further in the various steps of the method, as will be hereinafter fully described and claimed.

In carrying the invention into effect, crude rubber is dissolved to a semi-liquid condition in a compound solvent composed of benzin or like volatile hydro-carbon, and a resin solvent such as acetone, the mass containing all of the components of the rubber in solution. The action of the benzin is, as is well known, to resolve the rubber, while the acetone acts in a like manner on the resin and other impurities in the rubber and reduces them to a condition in which they will intimately commingle with the rubber, and form constituents thereof.

Fibrous asbestos, in a proportion that varies according to the article for which the product is designed, is stirred into the semi-liquid mass, the operation being continued until thorough admixture is secured. The fibered mixture is then dried either in the air, or in a suitable apparatus, to evaporate the solvents, leaving the product in a doughy or putty condition. This is now kneaded in a strong salt brine for a sufficient time to insure perfect coagulation of the rubber, after which it is again subjected to the action of a drying agent to evaporate any moisture that may remain from the brine. The product is now ready to be rolled into sheets of various widths and thicknesses, or to be molded into any desired shape. The final step is to vulcanize the articles produced from the product, and this may be accomplished in any well known or preferred manner.

The fibrous asbestos not only materially strengthens the final product and imparts to it a marked increase in its power to resist wear and the deteriorating action of the elements, but largely reduces the cost of production of articles made from the product as the asbestos replaces from twenty-five to fifty per cent. of rubber that would otherwise have to be employed to bring the manufactured articles to standard thickness and weight.

I claim:

1. The method of producing a rubber-containing product, which consists in dissolving crude rubber in a compound solvent, of which one of the resolvents acts directly on the rubber and the other on the resins and other impurities thereof, to a semi-liquid condition in which all of the components of the rubber are in solution, intimately incorporating a fibrous material with the mass, and drying until the solvents are eliminated.

2. The method of producing a rubber-containing product, which consists in dissolving crude rubber in a compound solvent, of which one of the resolvents acts directly on the rubber and the other on the resins and other impurities thereof, to a semi-liquid condition in which all of the components of the rubber are in solution, intimately incorporating a fibrous material with the mass, drying until the solvents are eliminated, coagulating the rubber, and finally drying it.

3. The method of producing a rubber-containing product which consists in dissolving crude rubber, in a compound solvent consisting of a volatile hydro-carbon and acetone, to a semi-liquid condition in which all the components of the rubber are in solution, intimately incorporating a fibrous material with the mass, drying until the solvents are eliminated, coagulating the rubber, and finally drying it.

4. The method of producing a rubber-containing product which consists in dissolving crude rubber, in a compound solvent consisting of benzin and acetone, to a semi-liquid condition in which all the components of the rubber are in solution, intimately incorporating a fibrous material with the mass, drying until the solvents are eliminated, coagulating the rubber, and finally drying it.

5. The method of producing a rubber containing product which consists in dissolving crude rubber, in a compound solvent consisting of benzin and acetone, to a semi-liquid condition in which all the components of the rubber are in solution, intimately incorporating a fibrous material with the mass, drying until the solvents are eliminated, coagulating the rubber, drying, rolling into sheets of desired thickness, and finally vulcanizing.

In testimony that I claim the foregoing as my own, I have hereto affixed my signature in the presence of two witnesses.

ALFRED E. MERRITT.

Witnesses:
D. L. DENTON,
M. Q. WHITEHEAD.

Copies of this patent may be obtained for five cents each, by addressing the "Commissioner of Patents, Washington, D. C."